United States Patent
Reinertson et al.

(10) Patent No.: US 11,602,098 B1
(45) Date of Patent: Mar. 14, 2023

(54) FERTILIZER STICK

(71) Applicant: SimplyGro LLC, Bedford, NH (US)

(72) Inventors: James Reinertson, Portsmouth, NH (US); Cabot Carabott, Leominster, MA (US)

(73) Assignee: SimplyGro LLC, Bedford, NH (US)

( * ) Notice: Subject to any disclaimer, the term of this patent is extended or adjusted under 35 U.S.C. 154(b) by 555 days.

(21) Appl. No.: 16/711,669

(22) Filed: Dec. 12, 2019

Related U.S. Application Data

(60) Provisional application No. 62/778,942, filed on Dec. 13, 2018.

(51) Int. Cl.
| | |
|---|---|
| *A01C 21/00* | (2006.01) |
| *C05B 1/04* | (2006.01) |
| *C05F 11/02* | (2006.01) |
| *C05C 9/00* | (2006.01) |
| *C05G 5/40* | (2020.01) |
| *C05D 9/00* | (2006.01) |
| *C05F 11/00* | (2006.01) |
| *C05G 5/00* | (2020.01) |

(52) U.S. Cl.
CPC ............... *A01C 21/00* (2013.01); *C05B 1/04* (2013.01); *C05C 9/00* (2013.01); *C05D 9/00* (2013.01); *C05F 11/00* (2013.01); *C05F 11/02* (2013.01); *C05G 5/45* (2020.02)

(58) Field of Classification Search
None
See application file for complete search history.

(56) References Cited

U.S. PATENT DOCUMENTS

| | | | | |
|---|---|---|---|---|
| 5,317,037 A | * | 5/1994 | Golden | A63B 57/10 523/128 |
| 5,976,210 A | * | 11/1999 | Sensibaugh | C05F 11/08 71/64.11 |
| 2007/0232563 A1 | * | 10/2007 | Uchida | A01K 61/50 514/53 |
| 2014/0345342 A1 | * | 11/2014 | Ushijima | C09K 3/22 71/11 |

FOREIGN PATENT DOCUMENTS

CN 101284747 A * 7/2012 ............. C05F 17/00

* cited by examiner

*Primary Examiner* — Wayne A Langel
(74) *Attorney, Agent, or Firm* — Sunstein LLP

(57) ABSTRACT

A fertilizer stick comprising a saccharide and a fertilizer dispersed therein, wherein the saccharide constitutes about 25% to about 95% (w/w) of the stick.

9 Claims, 3 Drawing Sheets

FERTILIZER STICK

CROSS-REFERENCE TO RELATED APPLICATION

This patent application claims the benefit of U.S. Provisional Patent Application No. 62/778,942, filed Dec. 13, 2018. The disclosure of this provisional patent application is incorporated by reference herein in its entirety.

FIELD OF INVENTION

The present disclosure relates to easy-to-use fertilizer systems.

BACKGROUND

Traditional fertilizer sticks are usually made with compressed granule fertilizer and suffer from number of long-standing unaddressed problems. The sticks usually give off a strong urea odor and start to break down when exposed to any heat or humidity, causing the packaging to bloat on the shelf and rendering the product unsellable. Granule fertilizer materials tend to be fragile and the sticks need a protective cap to prevent breakage when being driven into the soil. Another problem is caused by the relatively quick release of the fertilizer nutrients which is usually complete within only two to three months from the time a stick is planted. Moreover, the compressed materials of traditional sticks are relatively fragile, which makes them unsuitable to individual wrapping in sealed packages. Instead, the sticks are delivered in sturdier, larger packages containing more than one piece.

SUMMARY

In a first set of embodiments, the present application provides a fertilizer stick including a saccharide and a fertilizer dispersed therein, wherein the saccharide constitutes about 25% to about 95% (w/w) of the stick. The saccharide may be chosen from monosaccharides, disaccharides, trisaccharides, and combinations thereof. Example saccharides include glucose, fructose, galactose, sucrose, lactose, maltose, maltotriose, raffinose, and combinations thereof. Preferably, the saccharide constitutes from about 40% (w/w) to about 95% (w/w) of the stick, and more preferably 60% (w/w) to about 95% (w/w) of the stick. In some embodiments, the saccharide is a component of a saccharide-based material that is formed by heating and kneading a precursor mixture containing the saccharide. Example precursor mixtures include syrups and molasses. In a number of embodiments, the fertilizer may be an organic fertilizer, an inorganic fertilizers, and mixtures thereof. Example fertilizers include monocalcium phosphate, urea, soy protein, and soy oil.

In a second set of representative embodiments, the present application provides a method for manufacturing a fertilizer stick. The method includes heating a precursor mixture including a saccharide, to form a cooked precursor mixture; kneading the cooked precursor mixture, to form a kneaded mixture; blending the kneaded mixture with a fertilizer, to form a product mixture, and shaping the product mixture into the fertilizer stick. Example precursor mixtures include syrups and molasses. The saccharide may be chosen from monosaccharides, disaccharides, and trisaccharides. In some embodiments, the precursor mixture is heated to a temperature from at least 270° F. to at most 290° F. Preferably, the water content of the cooked precursor mixture is at least about 7.5% (w/w) to at most about 12.5% (w/w). During kneading, the cooked precursor mixture may be subjected to compressed air, for example air compressed to a pressure of at least about 10 lb/in$^2$ to about 40 lb/in$^2$. The fertilizer may be chosen from organic fertilizers, inorganic fertilizers, and mixtures thereof. Example fertilizers include monocalcium phosphate, urea, soy protein, and soy oil.

BRIEF DESCRIPTION OF DRAWINGS

The accompanying drawings, which are incorporated in and constitute a part of this specification, illustrate embodiments and together with the description, serve to explain the principles of the methods and systems.

DETAILED DESCRIPTION OF SPECIFIC EMBODIMENTS

Definitions

Definitions. As used in this description and the accompanying claims, the following terms shall have the meanings indicated, unless the context otherwise requires:

The term "saccharide" has the meaning of a carbohydrate compound, such as a monosaccharide, disaccharide, or trisaccharide.

The term "sugar" has the same meaning as the term "saccharide".

The term "polyphosphate" has the meaning of a salt or ester of a polymeric oxyanion formed from PO4 (phosphate) structural units linked together by sharing oxygen atoms.

The term "rock phosphate" has the meaning of a sedimentary rock which contains high amounts of phosphate minerals The term "superphosphate" has the meaning of monocalcium phosphate (Ca(H2PO4)2).

The term "organic" refers to an item whose production and processing has been reviewed and certified by the Organic Materials Review Institute (OMRI).

Fertilizer Stick

Figure 1A:
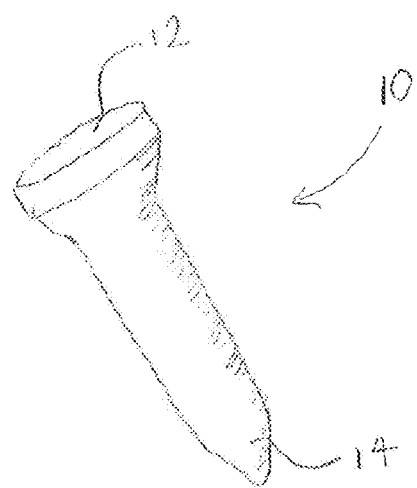
FIG. 1A illustrates the structure of an example fertilizer stick.

In a first aspect, the present application provides a novel fertilizer stick that includes one or more saccharides and one or more organic or synthetic fertilizers blended therein. The fertilizer stick of the invention is harder in consistency than traditional granular fertilizers and can be cast into a variety of shapes. As illustrated in the example fertilizer stick 10 of FIG. 1A, this harder consistency allows for the stick to be formed into a shape having flat top 12 and tapered end 14 that can be driven into the ground with no need for a protective cap. Because of this harder consistency, the fertilizer stick 10 is much less fragile than prior art sticks and, thus, is much less subject to breakage when being driven into the soil by a hammer or the like.

The stick readily solubilizes when added to water but surprisingly provides a slower release than traditional fertilizer sticks, taking up to six months to dissolve when planted in soil having a moisture content of about 25 vol%.

Figure 1B:
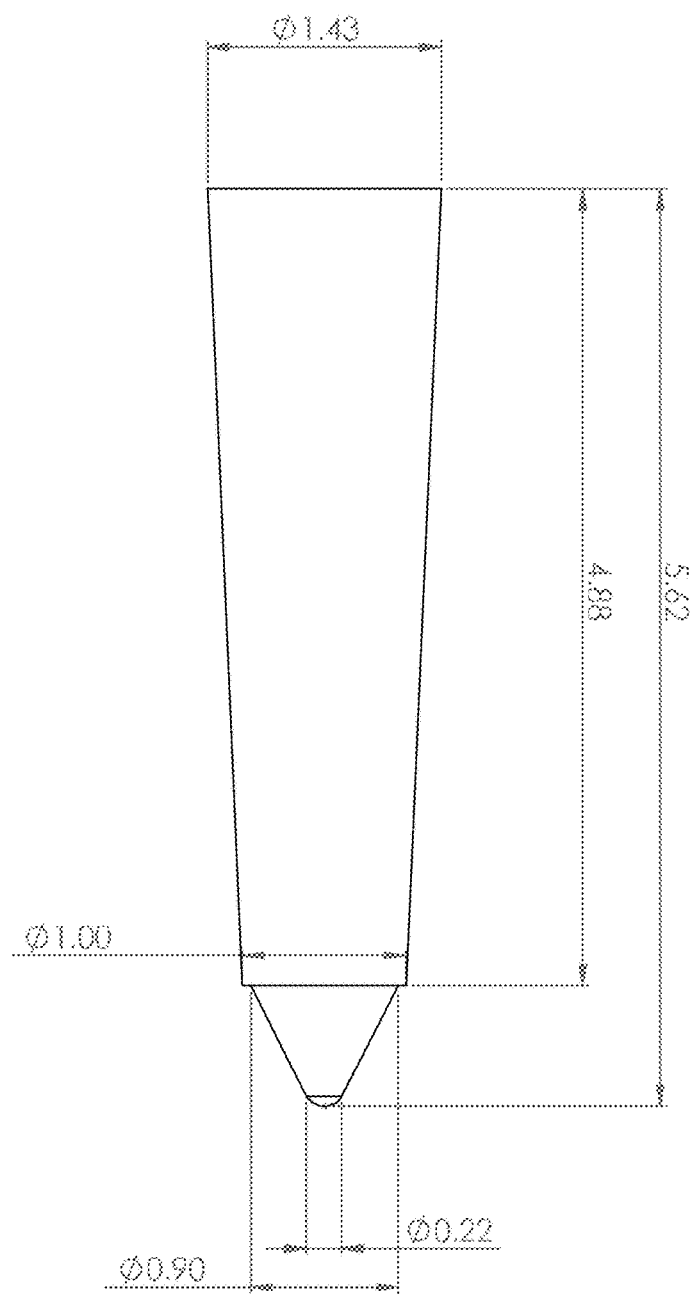
FIGS. 1B and 1C show elevation and perspective views respectively of an alternative embodiment of a fertilizer stick.
Figure 1C:
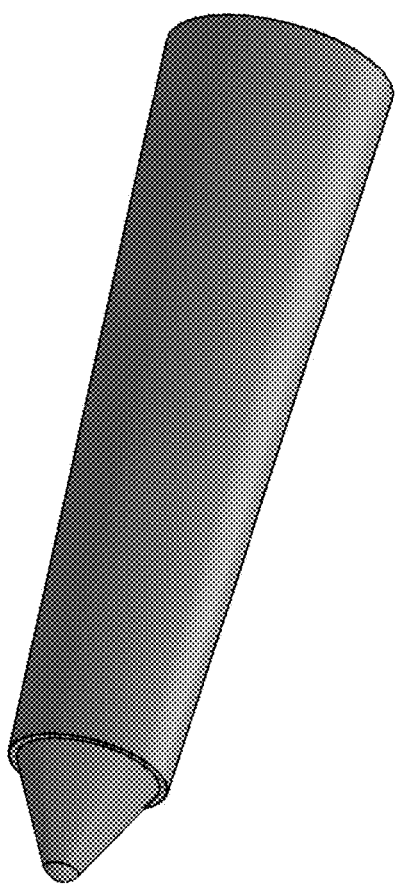

The stick of the invention is considerably more resistant to heat and humidity than traditional formulations, and is therefore much more stable and suitable for long haul transportation and prolonged storage prior to planting. In addition, its hard consistency allows for individually wrapping the stick in a sealed package, with no need for sturdier or larger packaging containing two or more sticks. Another example of a shape into which the fertilizer stick may be cast is shown in FIGS. 1B and 1C, which respectively show elevation and perspective views.

Saccharides

As intended herein, the saccharide component of the stick may include one or more carbohydrates. Any preferably water-soluble saccharide may be part of the fertilizer stick of the invention, but monosaccharides, disaccharides, and trisaccharides are preferred. Example monosaccharides include glucose (dextrose), fructose (levulose), and galactose; example disaccharides include sucrose, lactose, and maltose; and example trisaccharides include maltotriose and raffinose. The amount of saccharide in the composition of the stick may vary between about 25% to about 95%, by weight, based on the total weight of the composition (w/w). In exemplary embodiments, the saccharide is present in an amount of about 40% to about 95% (w/w), and in another set of representative embodiments the relative amount of saccharide is from about 60% to about 95% (w/w).

Molasses

In some embodiments, the saccharide may be present in the stick as a component of a saccharide-based material that is formed by heating and kneading a precursor mixture containing saccharides. The precursor mixture may be a syrup, that is, an aqueous mixture containing one or more saccharides. The syrup may in turn be manufactured by mixing saccharides with water and optionally other solvents. Naturally available syrups such as molasses and its derivatives are also contemplated. Because of its high sugar content, molasses is an effective, quick source of carbon energy for various forms of microbial life in soil and promotes better color, increased photosynthesis and stronger growth in trees, shrubs, flowers and vegetables. In addition, it has been found that molasses is an ideal carrier for nutrients contained in synthetic and organic fertilizers.

As used herein, the term "molasses" is referred to a syrup obtained during the refinement of sugars from the juice of a plant. Broadly, the juice of the plant is pumped into an evaporator that boils it until the water dissipates and the syrup remains. Eventually, the sugar crystallizes out of the syrup, creating a substance known as "massecuite". The massecuite is poured into a centrifuge to further separate the raw sugar crystals from the syrup. In the centrifuge, the sugar crystals dissociate from the syrup that is being spun at a significant force. This remaining syrup is molasses (containing the uncrystallized sugars), and it is forced out through holes in the centrifuge.

Molasses usually includes sucrose as its main saccharide together with variable amounts of glucose and fructose that are typically formed from the hydrolysis of a portion of the sucrose. In some embodiments, it can also comprise minor amounts of raffinose and dextran. Depending on the process used to obtain molasses, molasses can also contain vitamins (such as vitamin B, thiamin and/or niacin) as well as minerals (such as iron, calcium, potassium, magnesium, manganese and/or sodium). The water content of molasses is usually between about 28% and about 35% (w/w). Molasses usually contains very little fat and typically does not contain protein. Molasses may also contain volatile compounds such as, but not limited to, aliphatic esters, simple aliphatic acids, aromatic esters, aldehydes, and furan derivatives.

Two species of plants are predominantly used to produce molasses: the sugar cane (Saccharum officinarum) as well as the sugar beet (Beta vulgaris). In an embodiment, the molasses products and associated processes described herein are manufactured from types of molasses that are traditionally destined for human or animal consumption. The molasses that may be used as an ingredient of the fertilizer stick described herein is not limited to a single type of molasses from a single plant source. In an embodiment, the solid molasses product is derived from a single type of molasses (sugar cane, for example). However, in other embodiments, it may be preferable to produce a molasses derivative from more than one type of molasses.

The types of molasses that may be used in the fertilizer stick described herein may be subject to one or more types of treatment. For example, the molasses may include fractionated, enzymatically-treated, separated, filtered and/or inverted molasses. If desired, the molasses may undergo a process that reduces its moisture content, that is, a dehydration step, such as, for example, spray-drying or vacuum drying, to reduce the water content to at most about 5% (w/w) and above 0.01% (w/w) and obtain a dehydrated molasses product preferably in solid form. Even though the molasses product described herein can be obtained using various processes, in one advantageous embodiment it is possible to use a combination of vacuum and heat treatments to remove most of the water content of the original untreated molasses.

Fertilizers

The fertilizer of the stick may be one or more organic or synthetic fertilizers. The relative amount of fertilizer is dependent on the requirements of the applications for which the stick is intended, but is usually present in an amount of about 5% to about 65%, by weight, based on the total weight of the composition (w/w). In one set of representative embodiments, the fertilizer is present in an amount of about 10% to about 55% (w/w), and in another set of representative embodiments the relative amount of fertilizer is from about 15% to about 45% (w/w).

The fertilizer contains one or more macro- or micro-nutrients chosen from those commonly used in agricultural and gardening settings. Traditional main macro-nutrients include nitrogen (N), phosphorus (P), and potassium (K), or NPK fertilizers for short. Micro-nutrients that are considered to be essential to plant growth and health include boron, chlorine, cobalt, copper, iron, manganese, molybdenum, and zinc. The micronutrient needs depend on the plant. For example, sugar beets appear to require boron, and legumes require cobalt.

Fertilizers are classified in several ways. They are classified according to whether they provide a single nutrient (e.g., K, P, or N), in which case they are classified as "straight fertilizers." "Multinutrient fertilizers" (or "complex fertilizers") provide two or more nutrients, for example N and P. NPK rating is a rating system describing the amount of nitrogen, phosphorus, and potassium in a fertilizer. NPK ratings consist of three numbers separated by dashes (e.g., 10-10-10 or 16-4-8) describing the chemical content of fertilizers. The first number represents the percentage of nitrogen in the product; the second number, $P_2O_5$; the third, K2O. Fertilizers may not actually contain P2O5 or K2O, but the system is a conventional shorthand for the amount of the phosphorus (P) or potassium (K) in a fertilizer. For example, a 50-pound (23 kg) bag of fertilizer labeled 16-4-8 contains 8 lbs. (3.6 kg) of nitrogen (16% of the 50 pounds), an amount of phosphorus equivalent to that in 2 pounds of P2O5 (4% of 50 pounds), and 4 pounds of K2O (8% of 50 pounds).

Fertilizers are also sometimes classified as synthetic versus organic. Synthetic fertilizers usually exclude carbon-containing materials except urea and are sometimes called inorganic fertilizers since various chemical treatments are required for their manufacture. Organic fertilizers are usually plant- or animal-derived matter.

Inorganic Fertilizers

Single-nutrient ("straight") fertilizers include usually contain only one nutrient component. The main nitrogen-based straight fertilizer is ammonia or its solutions. Ammonium nitrate (NH4NO3), ammonium sulfate (NH4)2SO4, and urea are also widely used. The main straight phosphate fertilizers are rock phosphates, ammonium polyphosphate, and the superphosphates. "Single superphosphate" (SSP) is composed of about 14-18% P2O5, usually in the form of Ca(H2PO4)2 (monocalcium phosphate), but also phosphogypsum (CaSO4 • 2H2O). Triple superphosphate (TSP) typically consists of 44-48% of P2O5 and no gypsum. A mixture of single superphosphate and triple superphosphate is called double superphosphate. Straight potassium fertilizers include potassium oxide (K2O), potassium chloride (KCl), potassium sulphate (K2SO4) and potassium carbonate (K2CO3).

Binary fertilizers include either nitrogen and phosphorus ("NP"), nitrogen and potassium ("NK"), or phosphorus and potassium ("PK"). The main NP fertilizers are monoammonium phosphate (MAP) and diammonium phosphate (DAP). The active ingredient in MAP is NH4H2PO4. The active ingredient in DAP is (NH4)2HPO4. Other example binary fertilizers include potassium nitrate and monopotassium phosphate.

Organic Fertilizers

The term "organic fertilizers" describes those fertilizers with a biological origin, that is, fertilizers derived from living or formerly living materials. Organic fertilizers can also describe commercially available products that strive to follow the expectations and restrictions adopted by "organic agriculture" and "environmentally friendly" gardening that significantly limit or strictly avoid the use of synthetic fertilizers and pesticides. Organic production and processing are often monitored by organizations like the Organic Materials Review Institute (OMRI) that certify products manufactured according to organic standards. The organic fertilizer products typically contain both some organic materials as well as acceptable additives such as nutritive rock powders, ground sea shells (crab, oyster, etc.), other prepared products such as seed meal or kelp, and cultivated microorganisms and derivatives.

Organic fertilizers include animal products, plant derivatives, compost, and treated waste (biosolids). Preferred organic fertilizers for the stick of the present application include plant oils and plant proteins and their derivatives such as protein hydrolysates. The plant-derived fertilizers may be extracted from well-known legumes including alfalfa, clover, peas, chickpeas, lentils, lupin bean, mesquite, carob, soybeans, peanuts and tamarind. Particularly preferred are organic soybean oil and organic soy protein and its hydrolysates.

Packaging

The fertilizer stick may be provided in a biodegradable covering, preferably (but not necessarily) a shrink-wrap covering. This covering may include product information (including, for example, the list of ingredients, the trademark, the price, etc.). Such a wrapper permits the sale of individual sticks, as opposed to a set of sticks in a single package. The biodegradability of the covering permits the fertilizer stick to be hammered into the soil without being removed from the wrapper first. In an alternative embodiment the biodegradable wrapper may include perforations to permit the easy removal of the stick from the wrapper prior to insertion into the ground, if the user wishes to remove the wrapper first.

Method Of Manufacturing A Fertilizer Stick

Figure 2:
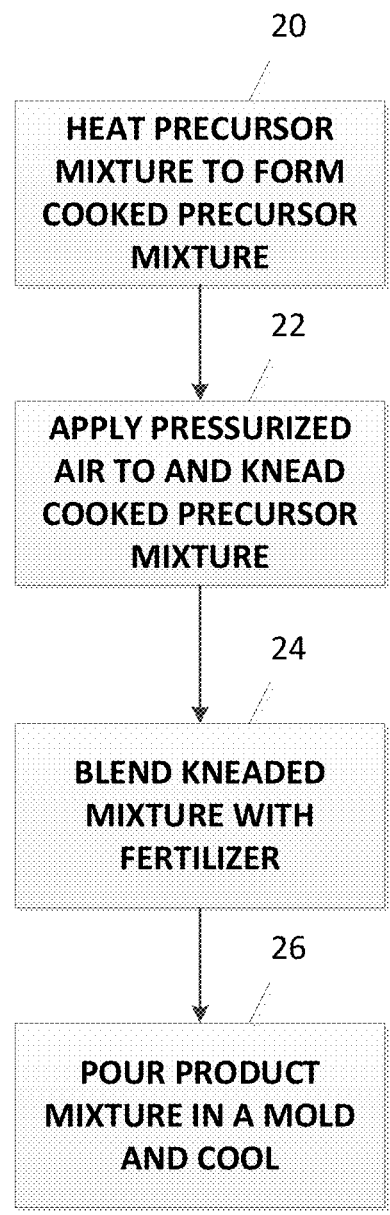
FIG. 2 is a flow chart of an example method for manufacturing a fertilizer stick.

In a second aspect, provided herein is a method for manufacturing a fertilizer stick from ingredients including one or more sugars and one or more fertilizers. FIG. 2 is a flow chart of an illustrative embodiment of the method. In step 20, a precursor mixture including one or more saccharides is heated to a temperature within a chosen range, to form a "cooked precursor mixture". In some embodiments, the precursor mixture is a solid or syrupy composition manufactured by mixing one or more saccharides and optionally other ingredients. In one example, the precursor mixture is a dried, plant-derived composition such as dried molasses. In additional examples, the precursor mixture may also include water and/or other solvents in addition to the one or more saccharides and other ingredients, forming a syrup. The syrup may be a natural syrup like molasses or instead be made by adding water and optionally other solvents to a composition including one or more saccharides.

The temperature, pressure, and time of heating may be chosen to form a cooked precursor mixture that yields a final product solid enough for planting into the soil without a cap but flexible enough for mixing with fertilizers. As known in the confectionery industry, sugar-based compositions such as syrups can be cast into softer or harder solids, usually depending on the relative amounts of moisture left in the syrup after cooking and the amount of kneading that the cooked syrup is subjected to. This property can be harnessed to produce harder or softer sticks depending on the requirements of the application at hand. For example, heating a water- and sugar-based syrup to a temperature in the range of about 250° F.-265° F. usually makes part of the water evaporate until the sugar concentration is about 90% (w/w) and the water concentration is about 10% (w/w), yielding a substance that when cooled has the hardness of a gummy or nougat. Further increasing the temperature of the syrup to about 270° F.-290° F. usually leads to additional loss of water, leading to a concentration of sugar of about 95% (w/w) and forming a flexible substance such as taffy or butterscotch. At temperatures of about 300° F.-310° F., the molten syrup is typically almost devoid of water and tends to form a hard, brittle solid on cooling. Preferably, the cooked precursor mixture has a water content of about 7.5% (w/w) to about 12.5% (w/w).

The cooked precursor mixture is kneaded while being subjected to pressurized air (step 22), to yield a "kneaded mixture" having a desired consistency. In exemplary embodiments, the air is at a pressure of about 10 lb/in2 to about 40 lb/in2. In step 24, the kneaded mixture is then blended with one or more fertilizers, for example by action of a ribbon blender, to form a product mixture. In step 26, the product mixture is poured into a mold and left to cool into the product fertilizer stick.

Example

A first fertilizer stick featuring an organic fertilizer was prepared as follows. An amount of 0.4317 lbs. of dehydrated beet molasses provided by QLF (Dodgeville, Wis.) was heated to 285° F. and cooked at that temperature for three minutes. The cooked molasses was then kneaded under air pressurized at 25 lb/in2 until a desired taffy-like consistency was reached. The taffy was mixed with 0.0668 lbs. of dry soy isolate (Purely 14-0-0 WSN, Purely Organic Products, Portsmouth, New Hampshire) and 0.0015 lbs. of fat-refined soy oil (QLF). The resulting mixture was poured into a mold and allowed to cool, to form a fertilizer stick weighing 0.5 lbs.

A second fertilizer stick was also prepared, this time with a synthetic fertilizer. An amount of 0.03101 lbs. of dehydrated beet molasses (QLF) was heated to 285° F. and cooked at that temperature for three minutes. The cooked molasses was then kneaded under air pressurized at 25 lb/in2 until a desired taffy-like consistency was reached. The taffy was mixed with 0.1564 lbs. of dry soy isolate, 0.0320 lbs. of monocalcium phosphate (Ca(H2PO4)2 and 0.0015 lbs. of fat-refined soy oil. The resulting mixture was poured into a mold and allowed to cool, to form a fertilizer stick weighing 0.5 lbs.

Both the first and second sticks could be driven into the soil without a protective cap and provided a slower nutrient release than traditional, commercially available fertilizer sticks. The first stick was found to lead to lower soil salinity and less microbial growth than the second stick, likely because of its organic fertilizer ingredient.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of manufacturing a fertilizer stick, comprising:
    heating a precursor mixture comprising a saccharide, to form a cooked precursor mixture;
    kneading the cooked precursor mixture, while subjecting the cooked mixture to compressed air, to form a kneaded mixture;
    blending the kneaded mixture with a fertilizer, to form a product mixture, and
    shaping the product mixture into the fertilizer stick.

2. The method of manufacturing a fertilizer stick of claim 1, wherein the precursor mixture comprises a syrup.

3. The method of manufacturing a fertilizer stick of claim 1, wherein the precursor mixture comprises molasses.

4. The method of manufacturing a fertilizer stick of claim 1, wherein the saccharide is selected from the group consisting of monosaccharides, disaccharides, trisaccharides, and combinations thereof.

5. The method of manufacturing a fertilizer stick of claim 1, wherein the precursor mixture is heated to a temperature from at least 270° F. to at most 290° F.

6. The method of manufacturing a fertilizer stick of claim 1, wherein the compressed air is at a pressure of at least about 10 lb/in$^2$ to at most about 40 lb/in$^2$.

7. The method of manufacturing a fertilizer stick of claim 1, wherein the fertilizer is selected from the group consisting of organic fertilizers, inorganic fertilizers, and mixtures thereof.

8. The method of manufacturing a fertilizer stick of claim 1, wherein the fertilizer is selected from the group consisting of monocalcium phosphate, urea, soy protein, soy oil, and combinations thereof.

9. The method of manufacturing a fertilizer stick of claim 1, wherein the water content of the cooked precursor mixture is at least about 7.5% (w/w) to at most about 12.5% (w/w).

* * * * *